(12) United States Patent
Amazutsumi

(10) Patent No.: US 6,364,696 B1
(45) Date of Patent: Apr. 2, 2002

(54) BATTERY CARRYING PORTABLE ELECTRIC EQUIPMENT

(75) Inventor: Toru Amazutsumi, Tuna-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/813,942

(22) Filed: Mar. 22, 2001

(30) Foreign Application Priority Data

Mar. 23, 2000 (JP) .............................................. 12-81514

(51) Int. Cl.⁷ .................................................. H01R 3/00
(52) U.S. Cl. ...................................... 439/500; 320/114
(58) Field of Search .............................. 439/500, 76.1; 320/114, 115, 112, 107; 429/99, 100

(56) References Cited

U.S. PATENT DOCUMENTS

| | | | |
|---|---|---|---|
| 4,009,429 A | | 2/1977 | Mullersman ................ 320/110 |
| 5,019,767 A | * | 5/1991 | Shirai et al. ................. 320/112 |
| 5,052,943 A | * | 10/1991 | Davis .......................... 439/357 |
| 5,268,629 A | * | 12/1993 | Franke ........................ 320/114 |
| 5,538,435 A | * | 7/1996 | Yohn ........................... 439/188 |
| 5,839,910 A | * | 11/1998 | Meller et al. ................ 439/188 |
| 6,129,582 A | * | 10/2000 | Wilhite et al. .............. 439/500 |

* cited by examiner

*Primary Examiner*—Tulsidas Patel
(74) *Attorney, Agent, or Firm*—Wenderoth, Lind & Ponack, L.L.P.

(57) ABSTRACT

A piece of portable electric equipment is provided with a case, a battery pack housed in the case, and an input/output (I/O) connector which is exposed outside the case and has charging terminals. The I/O connector is accessible inside the case and has connecting terminals which contact battery terminals on the battery pack housed in the case. The portable electric equipment case holds the battery pack with its battery terminals in direct contact with the connecting terminals of the I/O connector.

22 Claims, 4 Drawing Sheets

PRIOR ART

BATTERY CARRYING PORTABLE ELECTRIC EQUIPMENT

This application is based on application No. 81514/2000 filed in Japan on Mar. 23, 2000, the content of which incorporated hereinto by reference.

BACKGROUND OF THE INVENTION

This invention relates to portable electric equipment such as a portable telephone, and in particular to portable electric equipment provided with an input/output (I/O) connector in its case.

Portable electric equipment such as a portable telephone is provided with an I/O connector to connect with external equipment. Further, in battery carrying portable electric equipment, charging terminals for charging the battery can be included on the I/O connector to make the connector section compact. FIGS. 1 through 3 show the structure of an installed I/O connector with charging terminals As shown in these figures, prior art portable electric equipment have an I/O connector 13 fixed to a printed circuit board 4. The I/O connector 13 has charging terminals 14 and signal terminals 15 provided on its backside. The backside terminals are connected to the printed circuit board 4 via leads 16. In addition battery pack connecting terminals 12 are fixed to the printed circuit board 4 to connect with battery terminals 5 of a battery pack 2. These battery pack connecting terminals 12 are connected with the I/O connector 13 via conducting metals runs 17 on the printed circuit board 4 and via the leads 16.

In connecting the battery pack and I/O connector of prior art portable electric equipment having the structure described above, the battery pack connecting terminals are configured to push vertically onto the printed circuit board for attachment to the board. This has the drawback that unused dead-space is created both inside the case and the battery pack. This dead-space makes it difficult to reduce the size of the case.

Further, in portable electric equipment having the structure described above, the I/O connector and battery pack connecting terminals are joined via printed circuit board conducting metal runs and by leads. If contact conditions degrade, this has the drawback that contact resistance problems can easily arise. This is because battery pack connecting terminals are joined with the I/O connector by solder junctions in at least three places. Wiring to supply the battery pack with charging current is subject to much larger current flow than I/O connector wiring for signal transmission. Consequently, if contact resistance increases due to a poor connection, normal battery charging can become impossible.

Still further, in portable electric equipment having the structure described above, it is necessary to attach the battery pack connecting terminals to the printed circuit board, and it is also necessary to connect the charging terminals provided on the backside of the I/O connector to the printed circuit board via the leads. This has the additional drawback that manufacturing is complex.

The present invention was developed to resolve all these types of problems with a single innovation. Thus, it is a primary object of the present invention to provide battery carrying portable electric equipment in which unused dead-space in both the case and battery pack can be reduced, and the portable electric equipment can be made small, lightweight, and at low cost.

The above and further objects and features of the invention will more fully be apparent from the following detailed description with accompanying drawings.

SUMMARY OF THE INVENTION

The battery carrying portable electric equipment of the present invention is provided with a case, a battery pack housed in the case, and an I/O connector which is exposed outside the case and has charging terminals. The I/O connector is accessible inside the case and has connecting terminals to contact the battery terminals of the battery pack housed in the case. The portable electric equipment houses the battery pack with its battery terminals in direct contact with the connecting terminals of the I/O connector.

This battery carrying portable electric equipment has the characteristic that unused dead-space in both the case and battery pack can be reduced and it can be made small, lightweight, and at low cost. This is because the portable electric equipment of the present invention is provided with an I/O connector having connecting terminals accessible from inside the case for contact with battery pack terminals, and the terminals of the battery pack housed in the case are put in direct contact with the connecting terminals of the I/O connector. In portable electric equipment allowing direct connection of battery pack terminals and I/O connector connecting terminals, dead-space inside the case and battery pack can be reduced. This allows miniaturization and light weight fabrication to be realized.

Further, in the portable electric equipment described above, battery pack connecting terminals are not routed along printed circuit board conducting metal runs or along leads as in prior art technology. Since battery pack terminals are directly connected to the I/O connector, this portable is electric equipment has the characteristics that manufacturing complexity can be reduced, it can be inexpensively produced, and contact resistance problems can be effectively prevented. In particular, since large currents flow through wiring which supplies a battery pack with charging current, drastic reduction in contact resistance problems has the feature that the battery pack can be properly charged and discharged and safely used over long periods.

Preferably, the I/O connector is fixed to a printed circuit board housed in the case of the portable electric equipment of the present invention, and the I/O connector is provided with connecting terminals extending out from its backside. Battery terminals disposed on the plane of the battery pack, which is housed in the case and oriented parallel to the printed circuit board, contact the connecting terminals of the I/O connector.

DETAILED DESCRIPTION OF THE INVENTION

Figure 1:
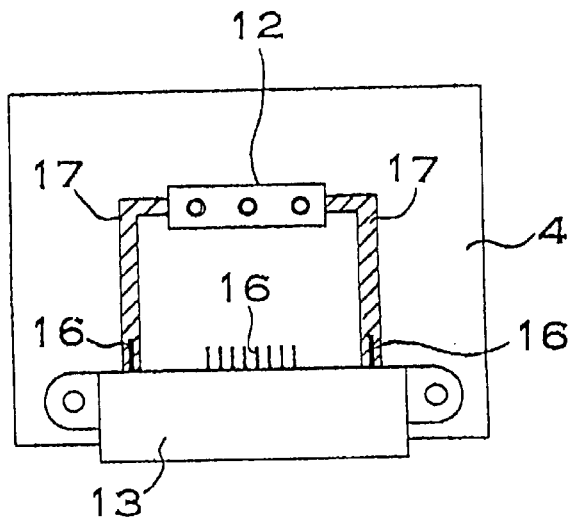
FIG. 1 is a plan view showing the installed configuration of the I/O connector of a prior art push portable electric equipment.
Figure 2:
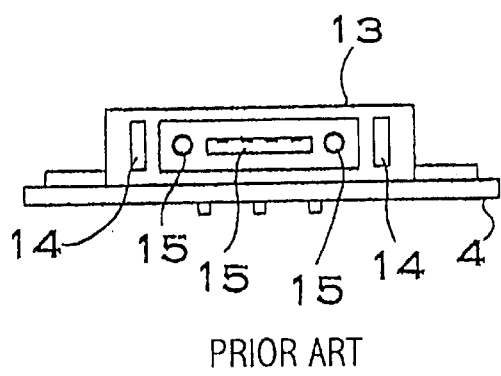
FIG. 2 is a front view of the I/O connector shown in FIG. 1.
Figure 3:
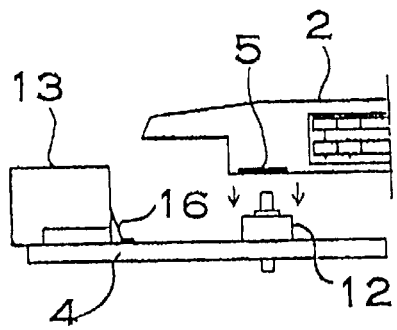
FIG. 3 is an exploded side view showing attachment of a battery pack to the battery pack connecting terminals shown in FIG. 1.
Figure 4:
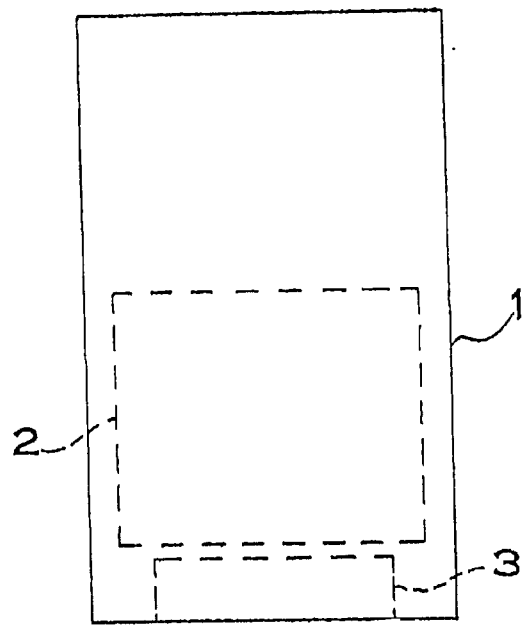
FIG. 4 is a plan view of an embodiment of the portable electric equipment of the present invention.
Figure 5:
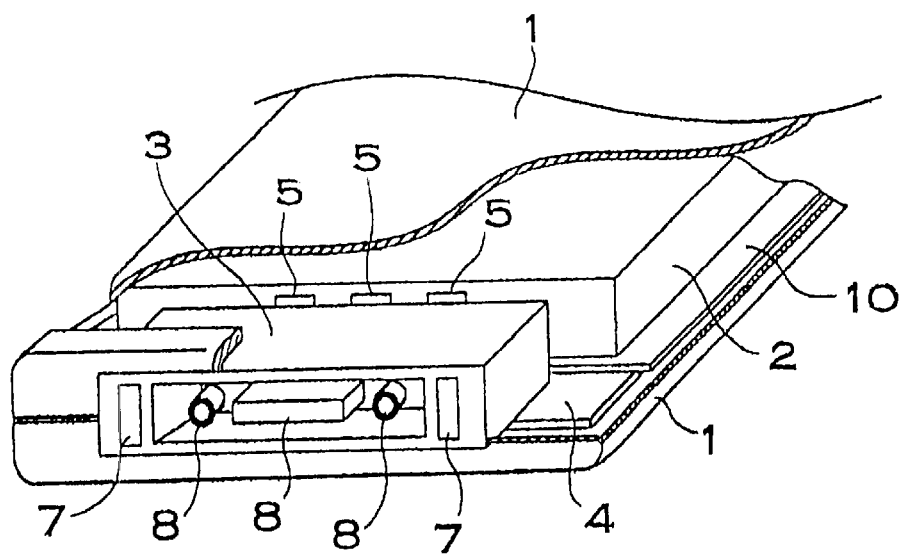
FIG. 5 is an enlarged oblique view partially in cross-section of the portable electric equipment shown in FIG. 4.

The portable electric equipment shown in the plan view of FIG. 4 and partially in the oblique view of FIG. 5 is provided with a case 1, a battery pack 2 housed inside the case 1, an I/O connector 3 established at the bottom end of the case 1, and a printed circuit board 4 to which the I/O connector 3 is attached.

The case 1 is provided with an open section at its bottom end to expose the I/O connector 3 outside the case 1. Further, the case holds the battery pack 2 in a fixed position. The battery pack 2 is housed inside the case 1 in a removable fashion or in a permanently attached configuration. A case for a removable battery pack has an opening in its backside, is provided with a battery pack compartment, and has a compartment cover to close the compartment opening with a battery pack retained inside. The compartment cover can be fixed to the battery pack as a single unit, or it can be a separate part from the battery pack for closing the compartment opening.

The battery pack 2 is one or more rechargeable batteries contained in a casing. The battery pack 2 can be used repeatedly by recharging. The rechargeable batteries can be nickel hydrogen batteries, nickel cadmium batteries, lithium ion rechargeable batteries, etc. The battery pack is provided with battery terminals 5 exposed at the plane of the casing. The battery terminals 5 are metal plates parallel to, and fixed to the plane of the casing. The battery pack 2 of FIG. 5 is provided with three battery terminals 5 which are the positive and negative power supply terminals and one signal terminal. As shown in the cross section of FIG. 6, the battery terminals 5 directly contact and make electrical connection with connecting terminals 6 provided on the backside of the I/O connector 3.

The battery pack 2 has a thin prismatic shape and is installed in the battery pack compartment of the case 1 one layer above the printed circuit board 4 with an intervening barrier 10, which is an insulating board. Although it is not illustrated, the case 1 has a structure which can hold the battery pack in a fixed position. For example, the case 1 may be configured with a battery pack compartment having inside dimensions approximately equal to the outside dimensions of the battery pack allowing the battery pack to fit tightly into a specified position inside the compartment.

In this specification a "battery pack" is intended not only to battery assembly which is packed, but it also includes battery itself without package.

Figure 7:
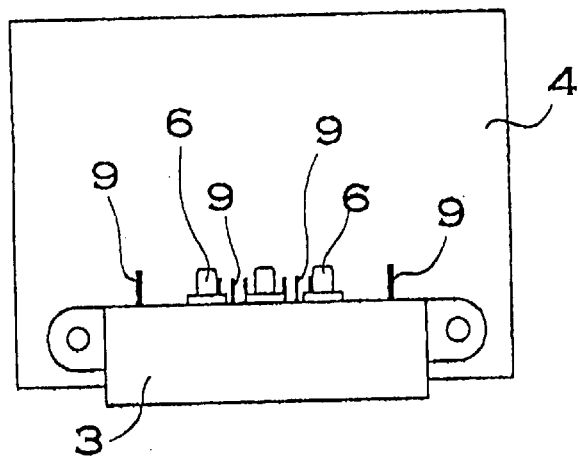
FIG. 7 is a plan view showing the I/O connector and printed circuit board of the portable electric equipment shown in FIG. 6.
Figure 8:
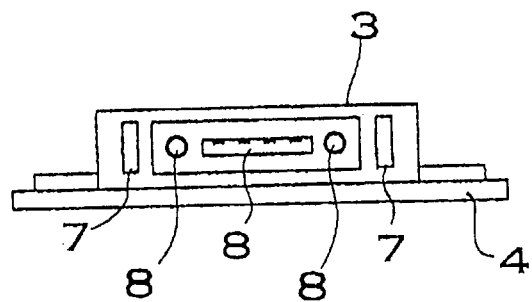
FIG. 8 is a front view of the I/O connector shown in FIG. 7.

As shown in the plan view of FIG. 7 and the front view of FIG. 8, the front side of the I/O connector 3 is provided with charging terminals 7 for charging the battery pack 2 and with signal terminals 8 for transmitting signals from the portable electric equipment to externally connected equipment. The backside of the I/O connector 3 is provided with connecting terminals 6 for connection with the battery pack 2 and with leads 9 for connection with the printed circuit board 4.

The connecting terminals 6 connect directly with the battery terminals 5 to charge the battery pack 2. Consequently, although it is not illustrated, the connecting terminals 6 are electrically connected inside the I/O connector 3 to the charging terminals 7 on the front side. The connecting terminals 6 are disposed in a manner projecting outwards from the backside of the I/O connector 3 body. These connecting terminals 6 can thereby reliably connect with the battery terminals 5, which are disposed in board from the plane of the battery pack 2 casing. Further, the connecting terminals 6 are held in the body of the I/O connector 3 via flexible material (not illustrated) also inside the body of the I/O connector 3. The connecting terminals 6 thereby project from the body of the I/O connector 3 in a resilient fashion. These connecting terminals 6 can reliably electrically connect with the battery terminals 5 of the battery pack 2 to drastically reduce contact resistance problems. However, the connecting terminals 6 may also be solidly fixed in the body of the I/O connector 3. The I/O connector 3 is provided with three connecting terminals 6 projecting outwards from its backside. The three connecting terminals 6 connect with the three battery terminals 5 provided on the battery pack 2, which are the positive and negative power supply terminals and one signal terminal.

The connecting terminals 6 project outward in a direction parallel to the surface of the printed circuit board 4. Further, the connecting terminals 6 are installed in the body of the I/O connector 3 such that they project outward with resilience also in a direction parallel to the surface of the printed circuit board 4. This configuration serves to insure that the connecting terminals 6 project towards, and make good electrical connection with the battery terminals 5 provided on the plane of the battery pack 2.

The body of the I/O connector 3 shown in the figures has a front-to-back cross section which is square. The front side of this square cross section is exposed outside the case 1, the backside is positioned inside the case 1, and the bottom portion which joins the front side and the backside is aligned along, and fixed to the printed circuit board 4. Leads 9 established on the backside of the I/O connector 3 are soldered to the printed circuit board 4 to attach the I/O connector 3 to the printed circuit board 4. The body of the I/O connector may also be bonded to the printed circuit board 4 for more reliable attachment.

The front side signal terminals 8 and the backside leads 9 are electrically connected inside the body of the I/O connector 3. The I/O connector 3 shown in the figures is provided with high frequency signal terminals 8 for coaxial cable connection disposed on both sides, and with signal terminals 8 for digital and analog signal transmission disposed between the coaxial connectors.

Figure 6:
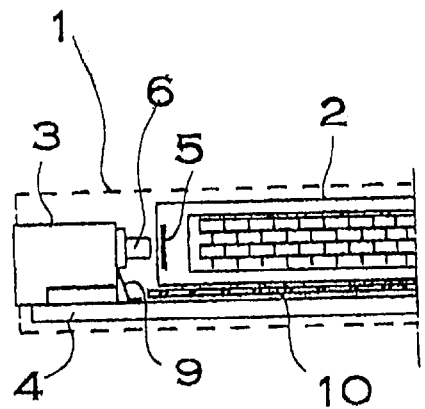
FIG. 6 is a cross-section view of the portable electric equipment shown in FIG. 4.

Turning to FIG. 6, the printed circuit board 4 is disposed along, and fixed to the inside surface of the case 1. A barrier 10 is provided on the upper surface of the printed circuit board 4 and the battery pack 2 is disposed above the barrier 10. Although it is not illustrated, the printed circuit board 4 is attached to the case 1 in a fixed position by a scheme such as screw attachment, adhesive bonding, or pressure fitting. The portable electric equipment shown in FIGS. 5 and 6 has a battery pack 2 disposed on the printed circuit board 4 with an intervening barrier 10. In FIGS. 5 and 6, the battery pack 2 and I/O connector 3 surfaces are covered by the case 1 or a battery compartment cover.

Figure 9:
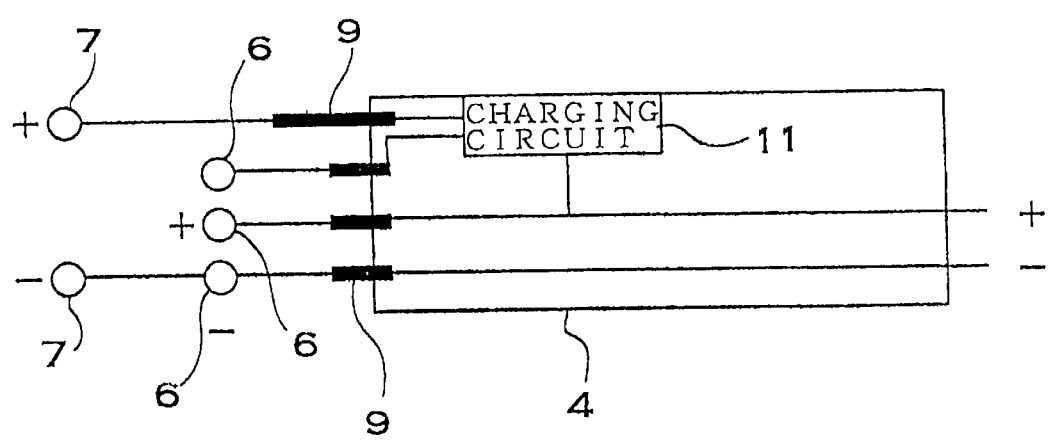
FIG. 9 is a diagrammatic wiring diagram of an embodiment of the portable electric equipment of the present invention.

Portable electric equipment with the above configuration is assembled by the following steps. (1) The printed circuit board 4 with the I/O connector 3 attached is fixed into a specified location in the case 1. (2) The battery pack 2 is mounted on top of the printed circuit board 4 (via the barrier 10), and the battery terminals 5 of the battery pack 2 are put in direct contact with the connecting terminals 6 of the I/O connector 3. In this configuration, the battery terminals 5 of the battery pack 2 are electrically connected with the connecting terminals 6. Consequently, if a battery charger is connected to the charging terminals 7 in this situation, the battery pack 2 will be charged. As shown in FIG. 9, the portable electric equipment houses a charging circuit 11 to charge the battery pack 2. Electronic parts for the charging circuit 11 are surface mounted on the printed circuit board 4.

As this invention may be embodied in several forms without departing from the spirit of essential characteristics thereof, the present embodiment is therefore illustrative and not restrictive, since the scope of the invention defined by the appended claims rather than by the description preceding them, and all changes that fall within the metes and bounds of the claims or equivalence of such metes and bounds thereof are therefore intended to be embraced by the claims.

What is claimed is:

1. A piece of portable electric equipment comprising:
   a case;
   a battery pack contained in said case; and
   an I/O connector having a front side which is exposed outside said case and a backside, said I/O connector having a plurality of sets of terminals on both said front side and said backside,
      wherein one set of said plurality of sets of terminals on said front side are charging terminals for charging said battery pack and another set of said plurality of sets of terminals on said front side are signal terminals for transmitting signals from said piece of portable electric equipment to external equipment, and one set of said plurality of sets of terminals on said backside are connecting terminals for connection to said battery pack, said connecting terminals being solidly fixed in a body of said I/O connector, and wherein said battery pack is housed with its battery terminals in direct contact with said connecting terminals of said I/O connector.

2. A piece of portable electric equipment as recited in claim 1, wherein said I/O connector is fixed to a printed circuit board housed in said case, said battery terminals are disposed on a plane of said battery pack which is housed in said case and oriented parallel to the printed circuit board, and said battery terminals are in contact with said connecting terminals of said I/O connector.

3. A piece of portable electric equipment as recited in claim 1, wherein said case has a battery pack compartment opening on a backside of said case, and said battery pack is held in a removable fashion in said battery pack compartment.

4. A piece of portable electric equipment as recited in claim 3, further comprising a battery compartment cover operable to close said battery pack compartment.

5. A piece of portable electric equipment as recited in claim 4, wherein said battery compartment cover is of single piece construction with said battery pack.

6. A piece of portable electric equipment as recited in claim 1, further comprising an intervening insulating barrier, wherein said battery pack has a thin prismatic shape and is installed in a battery pack compartment of said case and said intervening insulating barrier separates said battery pack from a printed circuit board.

7. A piece of portable electric equipment as recited in claim 1, wherein said case has a battery pack compartment with an inside shape approximately equal to an outline of said battery pack, and said battery pack fits tightly into said battery pack compartment, retaining said battery pack in a fixed position.

8. A piece of portable electric equipment as recited in claim 1, further comprising another set of said plurality of sets of terminals on said backside of said I/O connector, said another set of said plurality of sets of terminals on said backside being leads for connection with a printed circuit board in said piece of portable electric equipment.

9. A piece of portable electric equipment as recited in claim 8, wherein said leads of said I/O connector are soldered to the printed circuit board, thereby fixing said I/O connector to the printed circuit board.

10. A piece of portable electric equipment as recited in claim 1, wherein said I/O connector is bonded to a printed circuit board.

11. A piece of portable electric equipment as recited in claim 1, wherein said signal terminals on said front side of said I/O connector are electrically connected inside said I/O connector.

12. A piece of portable electric equipment comprising:
    a case;
    a battery pack contained in said case; and
    an I/O connector having a front side which is exposed outside said case and a backside, said I/O connector having a plurality of sets of terminals on both said front side and said backside,
       wherein one set of said plurality of sets of terminals on said front side are charging terminals for charging said battery pack and another set of said plurality of sets of terminals on said front side are signal terminals for transmitting signals from said piece of portable electric equipment to external equipment, and one set of said plurality of sets of terminals on said backside are connecting terminals for connection to said battery pack, said connecting terminals being housed in a body of said I/O connector such that said connecting terminals protrude from said body of said I/O connector in a resilient fashion along an axial direction of said connecting terminals, and wherein said battery pack is housed with its battery terminals in direct contact with said connecting terminals of said I/O connector.

13. A piece of portable electric equipment as recited in claim 12, wherein said I/O connector is fixed to a printed circuit board housed in said case, said battery terminals are disposed on a plane of said battery pack which is housed in said case and oriented parallel to the printed circuit board, and said battery terminals are in contact with said connecting terminals of said I/O connector.

14. A piece of portable electric equipment as recited in claim 12, wherein said case has a battery pack compartment opening on a backside of said case, and said battery pack is held in a removable fashion in said battery pack compartment.

15. A piece of portable electric equipment as recited in claim 14, further comprising a battery compartment cover operable to close said battery pack compartment.

16. A piece of portable electric equipment as recited in claim 15, wherein said battery compartment cover is of single piece construction with said battery pack.

17. A piece of portable electric equipment as recited in claim 12, further comprising an intervening insulating barrier, wherein said battery pack has a thin prismatic shape and is installed in a battery pack compartment of said case and said intervening insulating barrier separates said battery pack from a printed circuit board.

18. A piece of portable electric equipment as recited in claim 12, wherein said case has a battery pack compartment with an inside shape approximately equal to an outline of said battery pack, and said battery pack fits tightly into said battery pack compartment, retaining said battery pack in a fixed position.

19. A piece of portable electric equipment as recited in claim 12, further comprising another set of said plurality of sets of terminals on said backside of said I/O connector, said another set of said plurality of sets of terminals on said backside being leads for connection with a printed circuit board in said piece of portable electric equipment.

20. A piece of portable electric equipment as recited in claim 19, wherein said leads of said I/O connector are soldered to the printed circuit board, thereby fixing said I/O connector to the printed circuit board.

21. A piece of portable electric equipment as recited in claim 12, wherein said I/O connector is bonded to a printed circuit board.

22. A piece of portable electric equipment as recited in claim 12, wherein the signal terminals on said front side of said I/O connector are electrically connected inside said I/O connector.

* * * * *